(12) United States Patent
Adriansson (10) Patent No.: US 11,246,283 B2
(45) Date of Patent: Feb. 15, 2022

(54) TWO STEP MOULDING TEAT CLEANER

(71) Applicant: DELAVAL HOLDING AB, Tumba (SE)

(72) Inventor: Frank Adriansson, Tumba (SE)

(73) Assignee: DeLaval Holding AB, Tumba (SE)

( * ) Notice: Subject to any disclaimer, the term of this patent is extended or adjusted under 35 U.S.C. 154(b) by 401 days.

(21) Appl. No.: 16/322,382

(22) PCT Filed: Oct. 23, 2017

(86) PCT No.: PCT/SE2017/051036
§ 371 (c)(1),
(2) Date: Jan. 31, 2019

(87) PCT Pub. No.: WO2018/080379
PCT Pub. Date: May 3, 2018

(65) Prior Publication Data
US 2019/0159422 A1    May 30, 2019

(30) Foreign Application Priority Data
Oct. 27, 2016  (SE) .................................. 1651405-1

(51) Int. Cl.
*A01J 7/04* (2006.01)
*A01K 13/00* (2006.01)

(52) U.S. Cl.
CPC .............. *A01J 7/04* (2013.01); *A01K 13/001* (2013.01)

(58) Field of Classification Search
CPC ...... A01J 7/04; A01J 7/00; A01J 7/025; A01J 5/06; A01J 5/04; A01J 7/02; A01J 9/00;
(Continued)

(56) References Cited

U.S. PATENT DOCUMENTS 2,526,877 A * 10/1950 Jurgeleit ................. B29C 45/12
425/594
2,532,088 A    11/1950 Cordis
(Continued)

FOREIGN PATENT DOCUMENTS

EP    1 217 885 B1    5/2004
SE    527 446 C2    3/2006
(Continued)

OTHER PUBLICATIONS

International Search Report and Written Opinion, dated Jan. 5, 2018, from corresponding PCT application No. PCT/SE2017/051036.
(Continued)

*Primary Examiner* — Peter M Poon
*Assistant Examiner* — Jeffrey R Larsen
(74) *Attorney, Agent, or Firm* — Nixon & Vanderhye (57) ABSTRACT

A method and teat cleaner for producing, by injection moulding, a teat cleaner of a teat cleaning cup that includes an inner body forming a central cavity for enclosing a teat, an exterior part, and channels therebetween for injection moulding the inner body in a first tool having a core, sliders that each include a protrusion for forming an aperture in the inner body, and channel walls, and an outer casting mould; separating the inner body from the first tool; placing the inner body in a second tool that includes a casting mould and rods; inserting the rods for forming the channels; fixating the rods; and injection moulding the exterior part in the second tool; separating the second tool from the fused teat cleaner; and removing the rods.

19 Claims, 10 Drawing Sheets

(58) Field of Classification Search
CPC .. A01J 5/044; A01J 5/0075; A01J 5/08; A01J 5/16; A01J 5/02; B29C 45/1657; B29C 45/1671; B29C 2045/1659; B29C 45/164
USPC .............. 119/670; 264/255, 250, 328.8, 248
See application file for complete search history.

(56) References Cited

U.S. PATENT DOCUMENTS

| | | | |
|---|---|---|---|
| 3,889,920 A * | 6/1975 | Holbrook | A61M 1/0049 |
| | | | 249/151 |
| 6,591,784 B1 | 7/2003 | Ericsson | |
| 7,856,942 B2 | 12/2010 | Pettersson et al. | |
| 2004/0231603 A1 | 11/2004 | Bjork et al. | |
| 2005/0274327 A1* | 12/2005 | Johnsson | A01J 7/04 |
| | | | 119/670 |
| 2007/0245966 A1* | 10/2007 | Pettersson | A01J 5/08 |
| | | | 119/14.47 |

FOREIGN PATENT DOCUMENTS

| | | |
|---|---|---|
| WO | 03/098998 A1 | 12/2003 |
| WO | 2005/120217 A1 | 12/2005 |

OTHER PUBLICATIONS

SE Search Report, dated Jun. 30, 2017, from corresponding SE application No. 1651405-1.

* cited by examiner

TWO STEP MOULDING TEAT CLEANER

TECHNICAL FIELD

This document discloses a method and a system. More particularly, a method and a system are described, for two step moulding of a teat cleaner in a teat cleaning cup.

BACKGROUND

Before commencing milking of dairy animals, it has to be ensured that the teats of the animal are clean. Various solutions to this problem have been suggested. One in particular advantageous solution for cleaning teats of an animal is disclosed in the European patent EP 1217885 B1. The teat cleaning cup described therein is mainly compounded by an inner tube comprising a plurality of nozzle holes for spraying liquid/air on the teat, and an outer plastic sleeve enclosing the inner tube.

The nozzle holes of the inner tube of the teat cleaning cup according to the cited patent, typically about 88 holes, have to be drilled, which is expensive.

Further, a gap may result from the mounting of the inner tube and the outer tube, as the parts are produced with a certain manufacturing tolerance. Such gap may offer a foothold for germs, bacteria and dirt, which is undesired as the milk may be affected.

Further it is difficult to assemble and disassemble the teat cleaning cup, leading to more work/high costs during service.

Teats of the animals may sometimes be very dirty, as the animals (free range animals) may rest directly on the ground, which may be muddy and/or comprise manure. It would for this reason be desired to further improve the efficiency of teat cleaning.

SUMMARY

It is therefore an object of this invention to solve at least some of the above problems and improve teat cleaning of an animal.

According to a first aspect of the invention, this objective is achieved by a method for producing a teat cleaner of a teat cleaning cup. The teat cleaner comprises an inner body, forming a central cavity configured to enclose a teat of an udder. The inner body comprises an inner surface, facing the central cavity and an outer surface. The teat cleaner comprises an exterior part, enclosing the inner body and a set of channels situated between the inner body and the exterior part, by injection moulding. Further the method comprises moulding the inner body, in a first tool. The first tool comprises a core for forming the central cavity of the inner body. The first tool also comprises a set of sliders, each comprising at least one protrusion for forming an aperture in the inner body, extending from the outer surface of the inner body to the inner surface of the inner body; and channel walls extending along the length of the inner body. The first tool also comprises an outer casting mould, for forming the outer surface of the inner body. The method in addition comprises separating the inner body from the first tool. Further, the method also comprises placing the inner body in a second tool comprising a casting mould and a set of rods. The method comprises inserting the set of rods for forming the set of channels, between at least some of the channel walls of the inner body. Furthermore, the method also comprises fixating the inserted set of rods. The method also comprises moulding the exterior part in the second tool, thereby fusing the exterior part with the inner body for forming the teat cleaner. Additionally, the method further comprises separating the second tool from the fused teat cleaner. Also, the method comprises removing the fixated set of rods from the set of channels of the teat cleaner.

According to a second aspect of the invention, this objective is achieved by a teat cleaner of a teat cleaning cup. The teat cleaner comprises an inner body, forming a central cavity configured to enclose a teat of an udder. The inner body comprises an inner surface, facing the central cavity and an outer surface. The teat cleaner also comprises an exterior part, enclosing the inner body. Further, the teat cleaner also comprises a set of channels situated between the inner body and the exterior part, by injection moulding according to the first aspect of the invention.

According to a third aspect of the invention, this objective is achieved by a teat cleaning cup for cleaning a teat of an udder. The teat cleaning cup comprises a teat cleaner according to the second aspect. Further, the teat cleaning cup comprises a teat cleaner cup collar mounted on the opening of the teat cleaner opposite to the drainage means, for sealing between the udder and the teat cleaner. The teat cleaning cup also comprises a lower part removably attached to the teat cleaner, comprising a first cleaning liquid valve and a second cleaning liquid valve and a drainage means for draining used cleaning liquid from the teat cleaning cup. In addition, the teat cleaning cup comprises a seal arranged to be situated between the teat cleaner and the lower part, removably attached to the teat cleaner.

Thanks to the described aspects, by manufacturing the teat cleaner by injection moulding and thereby fuse the exterior part with the inner body, a seamless exterior of the teat cleaner is achieved. Thereby hygiene conditions are improved.

Further, the described injection moulding process reduces manufacturing costs of the teat cleaner cup.

Further, by reducing the number of entities comprised in the teat cleaner cup, by fusing some parts together, it becomes easier to assemble and disassemble the teat cleaner cup, leading to reduced manufacturing costs and a more service friendly product.

In addition, the teat cleaner cup becomes stiffer due to the injection moulding, which enhance the efficiency of the teat cleaner cup as pressure loss due to flexing walls is omitted or at least reduced.

Other advantages and additional novel features will become apparent from the subsequent detailed description.

FIGURES

Embodiments of the invention will row be described in further detail with reference to the accompanying figures, in which.

DETAILED DESCRIPTION

Embodiments of the invention described herein are defined as a teat cleaning cup, a teat cleaner of the teat cleaning cup and a method for producing the teat cleaner of the teat cleaning cup, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
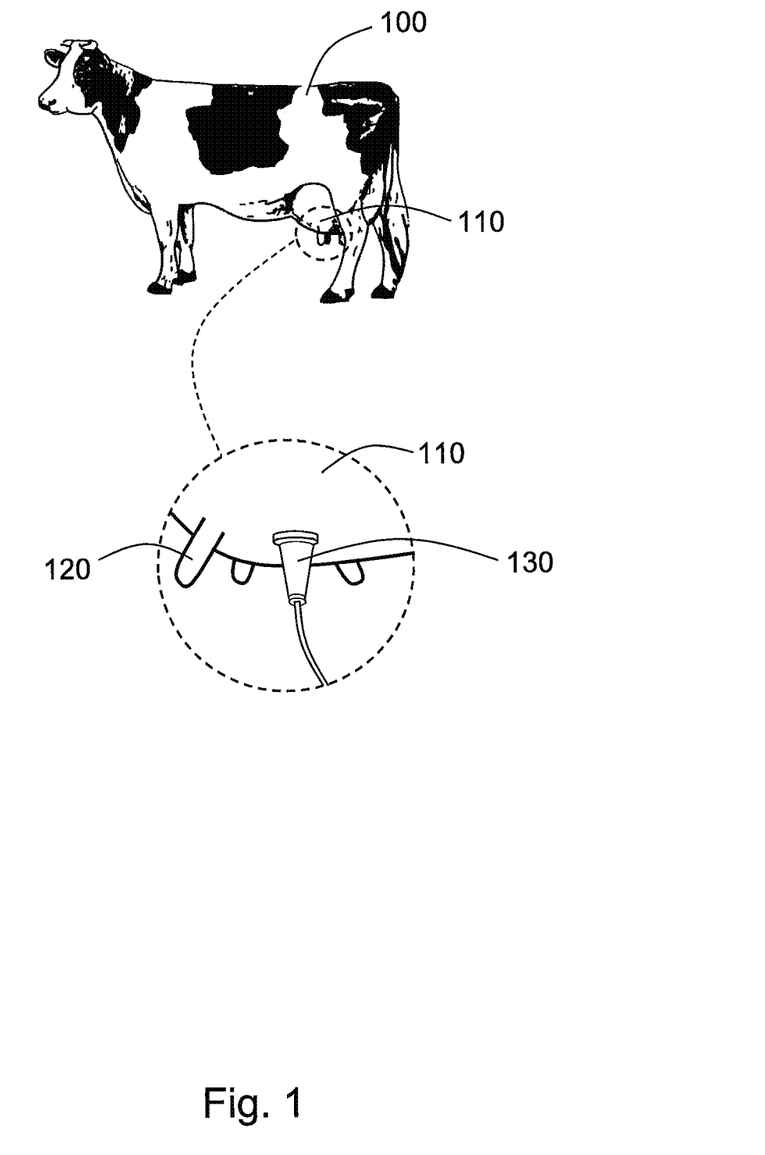
FIG. 1 illustrates a scenario where a teat cleaning cup is cleaning a teat of an animal udder of an animal.

FIG. 1 illustrates a scenario with an animal 100 comprised in a herd of animals for dairy farming.

"Animal" may be any arbitrary type of animal 100 relates to milk production. Typically, a domesticated mammal such as e.g. cow, goat, sheep, camel, horse, dairy buffalo, donkey, yak, etc.

The animal 100 typically has an udder 110, comprising a set of teats 120. The number of teats 120 on the udder 110 is different for different animals 100; for example, a sow has normally 16 teats, a cat has 8, a bear has 6, a cow has 4 while a horse, sheep, goat and human has 2, etc.

The milk of the animal 100 may be extracted by e.g. by a milking device, by automatic milking in a rotary milking parlour or by an automated robotic milking system, just to mention some few arbitrary examples.

A problem appearing when milking the animal 100 is that the teats 120 may be dirty. If the dirt is allowed to enter the milking machine, the dirt may affect the quality of the milk. Also, germs and bacteria may be spread between animals 100 in a farm, which may affect the health of the herd.

It is thus important to clean the teats 120 before milking, which cleaning may be made by a teat cleaning cup 130.

In order to use the milking machine as rational as possible, it is an advantage to start stimulating the milk production of the animal 100 and pre-milk the teats 120.

The teat cleaning cup 130 may operate e.g. in conjunction with, or as part of, a milking robot, or an automated milking system in a dairy farm. The parts and functionality of the teat cleaning cup 130 are discussed and explained in FIGS. 2A-2C and FIGS. 5-6.

A problem with previously known teat cleaning cups 130 as briefly described in the background section is that the design creates small gaps between the parts allows bacteria and dirt to start building up. Also, the costs of these machined parts are relatively high.

These problems are solved by eliminating gaps between different machined parts of the teat cleaning cup 130 by instead combining the machined parts into one entity, via a two-step injection moulding, as will be further explained in conjunction with the description of FIGS. 3A-4 and FIG. 7.

Various advantages are achieved by producing the teat cleaning cup 130 by two-step injection moulding. Firstly, as two previously separate parts are moulded, the possible gap between them (due to tolerance) is eliminated. Thereby dirt and bacteria have less options to gain a foothold.

Further, the moulding eliminates requirements of the complicated and expensive machining of the prior art parts, leading to reduced production costs.

Also, due to fewer parts in the teat cleaning cup 130, it becomes easier to assemble and disassemble the teat cleaning cup 130, leading to reduced service costs.

Further, the moulding generates a more stable construction, of the teat cleaning cup 130, leading to improved efficiency of the teat cleaning cup 130 since no flexing walls cause pressure loss.

But before discussing the two-step injection moulding in further detail, a presentation will be made of the teat cleaning cup 130, its functionality and its parts.

Figure 2A:
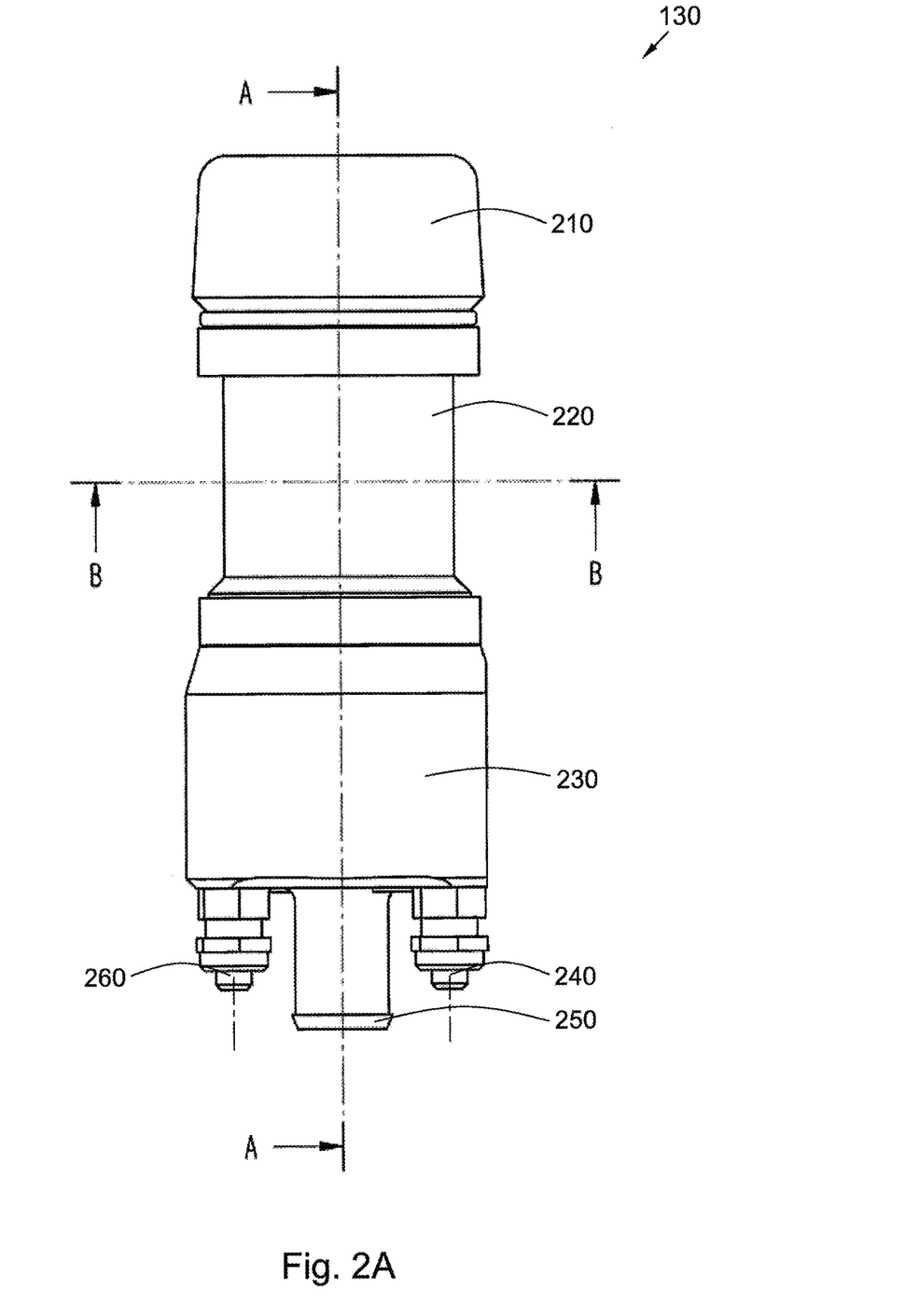
FIG. 2A illustrates an exterior view of a teat cleaning cup.

FIG. 2A illustrates an embodiment of the teat cleaning cup 130 substantially as previously described in FIG. 1.

The teat cleaning cup 130 comprises a teat cleaner, which in turn comprises an inner body and an exterior part 220, enclosing the inner body. The teat cleaning cup 130 also comprises a lower part 230 which may be realisably fastened to the teat cleaner. The lower part 230 may comprise a first cleaning liquid valve 240, a second cleaning liquid valve 260 in some embodiments, and a drainage means 250 for draining used cleaning liquid from the teat cleaning cup 130.

A vacuum supplying means, e.g. in the form of a non-collapsible pipe may in one of its ends connected to the drainage means 250 in the base of the teat cleaning cup 130, and with the other end to a vacuum supply for supplying an under-pressure within the teat cleaning cup 130, so as to facilitate draining used cleaning liquid from the teat cleaning cup 130 but also to enable pre-milking of the animal 100. To this end a collector waste tank may be arranged between the teat cleaning cup 130 and the vacuum supply, for collecting used cleaning liquid and extracted pre-milk (which typically is not used for human consumption). A milk detector may optionally be arranged between the teat cleaning cup 130 and the collector waste tank for detecting presence of milk in the cleaning liquid but also for possible examination of extracted pre-milk in some embodiments. In a non-limiting example, progesterone level of the milk of the animal 100 may be measured, which measurement may be used for heat detection in some embodiments. A shut off valve may be arranged between the collector waste tank and the vacuum supply, and a drain valve may be provided at the bottom of the collector waste tank.

Figure 2B:
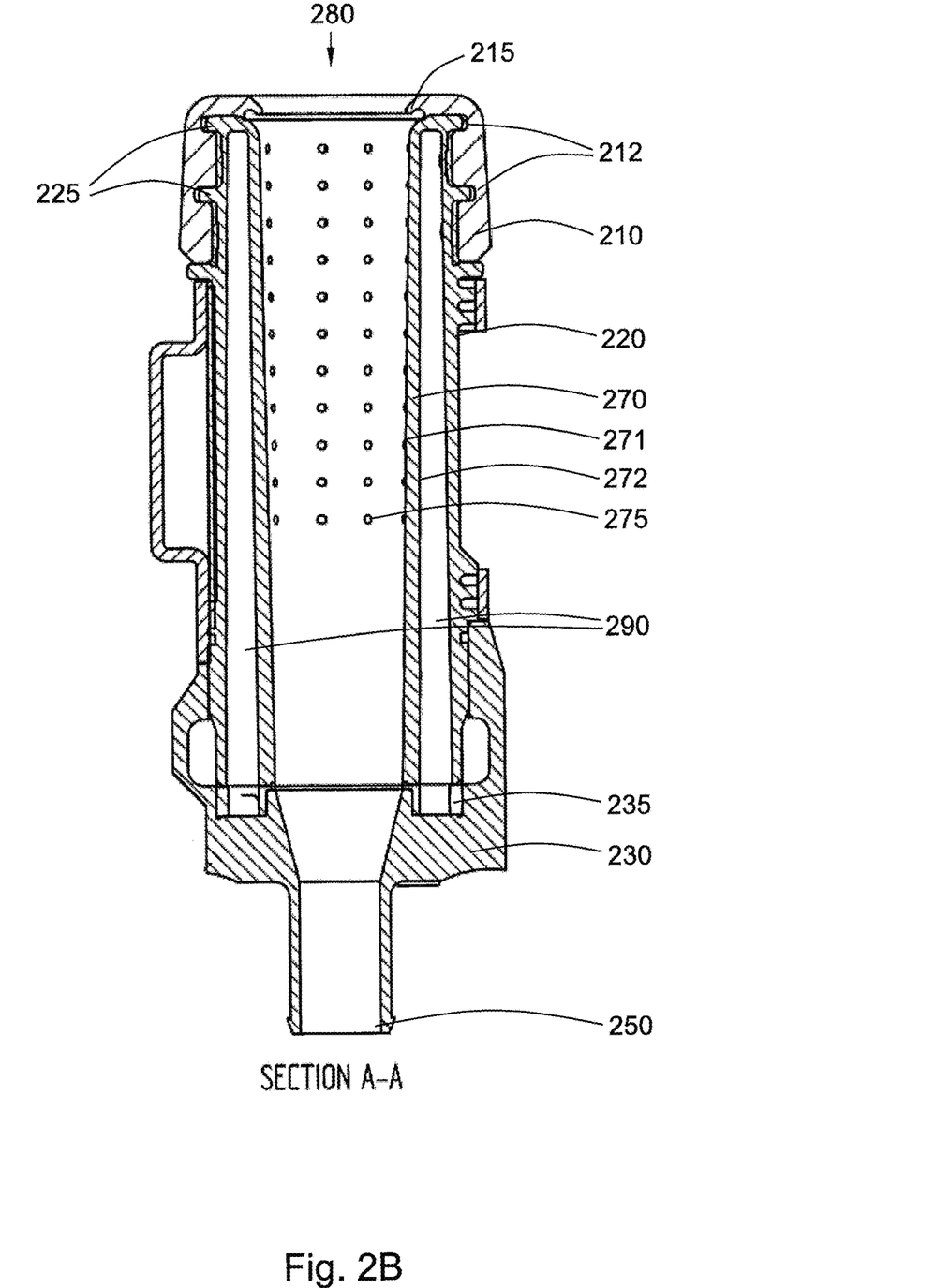
FIG. 2B illustrates a sectional view of section A-A of the teat cleaning cup in FIG. 2A.
Figure 2C:
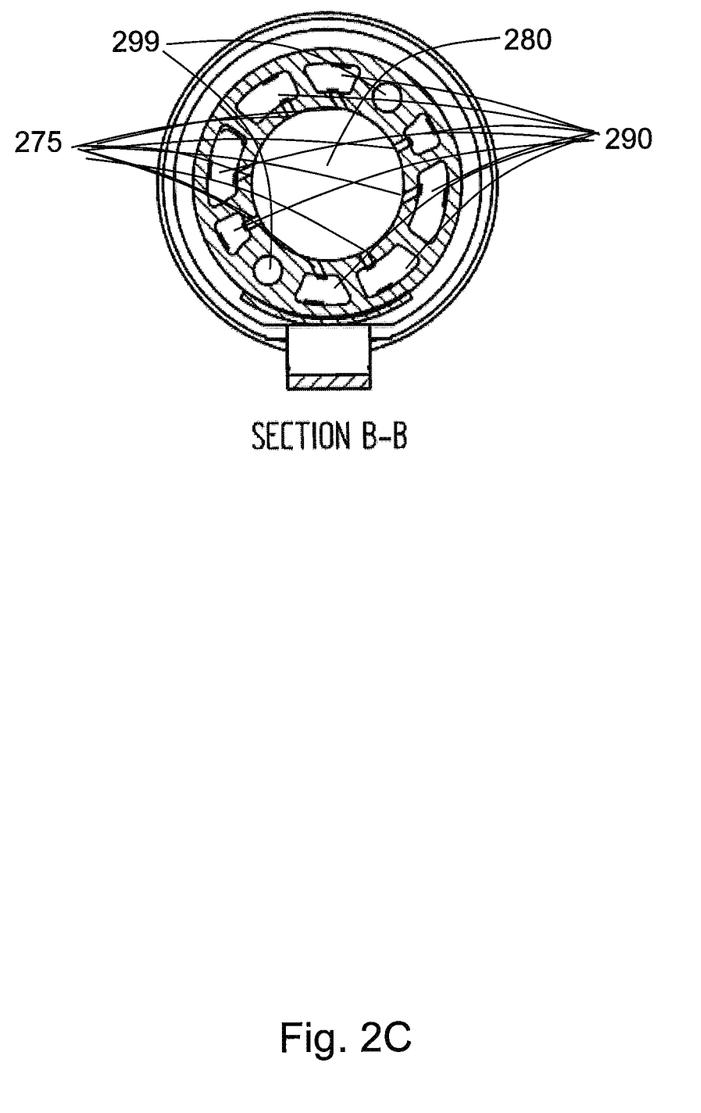
FIG. 2C illustrates a sectional view of section B-B of the teat cleaning cup in FIG. 2A.

The interior of the teat cleaning cup 130 in a first cross section A-A is illustrated in FIG. 2B and in a second cross section B-B in FIG. 2C.

FIG. 2B illustrates the cross section A-A of the teat cleaning cup 130 depicted in FIG. 2A.

The inner body 270 is forming a central cavity 280 configured to enclose a teat 120 of an udder 110. The inner body 270 comprises an inner surface 271, facing the central cavity 280 and an outer surface 272. Further, a set of apertures 275 in the inner body 270 are extending from the outer surface 272 of the inner body 270 to the inner surface 271 of the inner body 270.

Also, a set of channels 290 are situated between the inner body 270 and the exterior part 220 of the teat cleaner.

The set of channels 290 are connected to the set of apertures 275, and also to the first cleaning liquid valve 240 and the second cleaning liquid valve 260. Thereby, cleaning liquid may be injected into the central cavity 280 of the inner body 270 via the set of apertures 275, thereby spraying the teat 120 with the cleaning liquid.

In some embodiments, each channel 290 may be connected with a plurality of apertures 275 for injecting cleaning liquid into the teat cleaning cup 130. Hereby is achieved an enhanced injection distribution of the cleaning liquid into the teat cleaning cup 130. Such plurality of apertures 275 may be arranged substantially vertically in the teat cleaning cup 130 extending from a lowermost part of the teat cleaning cup 130 to an uppermost part of the teat cleaning cup 130. Hereby is achieved that the whole length of the teat 120 is cleaned when injecting cleaning liquid through the apertures 275.

The set of channels 290, which typically are elongated and longitudinal with the teat cleaning cup 130, circumferentially separated from each other, may be of two distinct types, i.e. some channels 290 may be configured for transportation of cleaning liquid and/or compressed air while some channels 290 are intended for transportation of ambient air of standard atmosphere pressure.

The channels of the first type may be configured connectable to any cleaning liquid valve 240, 260 while the channels of the second type are connected to ambient air via at least one aperture in the teat cleaner, thereby supplying said channels with air of standard atmosphere pressure.

The set of channels 290 may further be divided into different groups, such as e.g., two groups, each group comprising at least one channel from the first type of channels and at least one channel from the second type of channels.

In some such embodiments, the first group of channels may be connected with the first cleaning liquid valve 240 while the second group of channels may be connected with the second cleaning liquid valve 260. Further, the first group of channels may advantageously be arranged on a first semi-circumferential side of the teat cleaning cup 130 while the other group of channels may be arranged on the opposite semi-circumferential side of the teat cleaning cup 130.

Hereby is achieved that the teat 120 is deflecting from side to side when alternating the injection between the first and the second groups of channels. Consequently, hidden parts of the teat 120 is exposed for the injected cleaning liquid.

In some further embodiments, said first and second groups of channels may be symmetrically arranged on the first and second semi-circumferential sides of the teat cleaning cup 130. Hereby is achieved a uniformly distributed cleaning intensity of the teat 120. Hereby is achieved an enhanced cleaning action of the teat 120 and a pleasant animal experience is provided.

The mentioning of two groups of channels is merely a non-limiting example; a plurality of groups of each type of channels separated circumferentially in the teat cleaning cup 130 are also conceivable in some embodiments.

Each channel 290 is connected to a number of apertures 275, separated circumferentially in the teat cleaner, connected to a respective channel 290 of the teat cleaner.

In some alternative embodiments, the previously discussed apertures 275 may be angled tangentially with the central cavity 280 of the inner body 270, so as to allow injection of the cleaning liquid tangentially onto an inserted teat 120. Hereby is avoided a direct impact of the cleaning liquid onto the teat 120 while a whirling motion of the cleaning liquid inside the teat cleaning cup 130 is achieved, further enhancing the cleaning effect of the teat cleaning cup 130. Thereby dirt etc., may be rinsed from the teat 120, with minimal disturbance of the animal 100.

In some embodiments, the apertures 275 of the channels of the first type, for cleaning liquid transportation, may be tangentially angled, while the apertures 275 of the channels of the second type, for ambient air transportation may have any arbitrary shape, as they are intended to allow ambient air to flow through the apertures 275 into the central cavity 280.

In some further embodiments, the set of channels 290 may be configured to repeatedly supply compressed-air into the teat cleaning cup 130, thereby stimulating the teat 120. Hereby is achieved that milk let-down is easier induced since the pressure in the teat cleaning cup 130 fluctuates.

Further, the inner body 270 may comprise one or several exterior flanges 225, at least partly circumventing the exterior part 220.

The teat cleaning cup 130 also may comprise a teat cleaner cup collar 210. The teat cleaner cup collar 210 may be made of rubber, silicon or similar material. The teat cleaner cup collar 210 may comprise one or several recesses 212, corresponding to the exterior flanges 225 of the inner body 270. Thereby, the teat cleaner cup collar 210 may be fixated to the opening of the teat cleaner by fitting the recesses 212 of the teat cleaner cup collar 210 into the exterior flanges 225 of the inner body 270. Thereby, the teat cleaner cup collar 210 may be fixated to the upper part of the teat cleaner.

The teat cleaner cup collar 210 may in some embodiments comprise an edge 215 surrounding an opening of the teat cleaner cup collar 210, which opening is configured to enclose the teat 120, wherein the edge 215 is configured to physically remove dirt from the teat 120 when inserted into the central cavity 280 of the teat cleaning cup 130. Thereby, a mechanical cleaning of the teat 120 is introduced, as a complement to the liquid cleaning.

The lower part 230 is removably attached to the teat cleaner, e.g. via a threaded insert, connectable to a respective fastening element for removably attaching the lower part 230 to the teat cleaner, in some embodiments.

Figure 6:
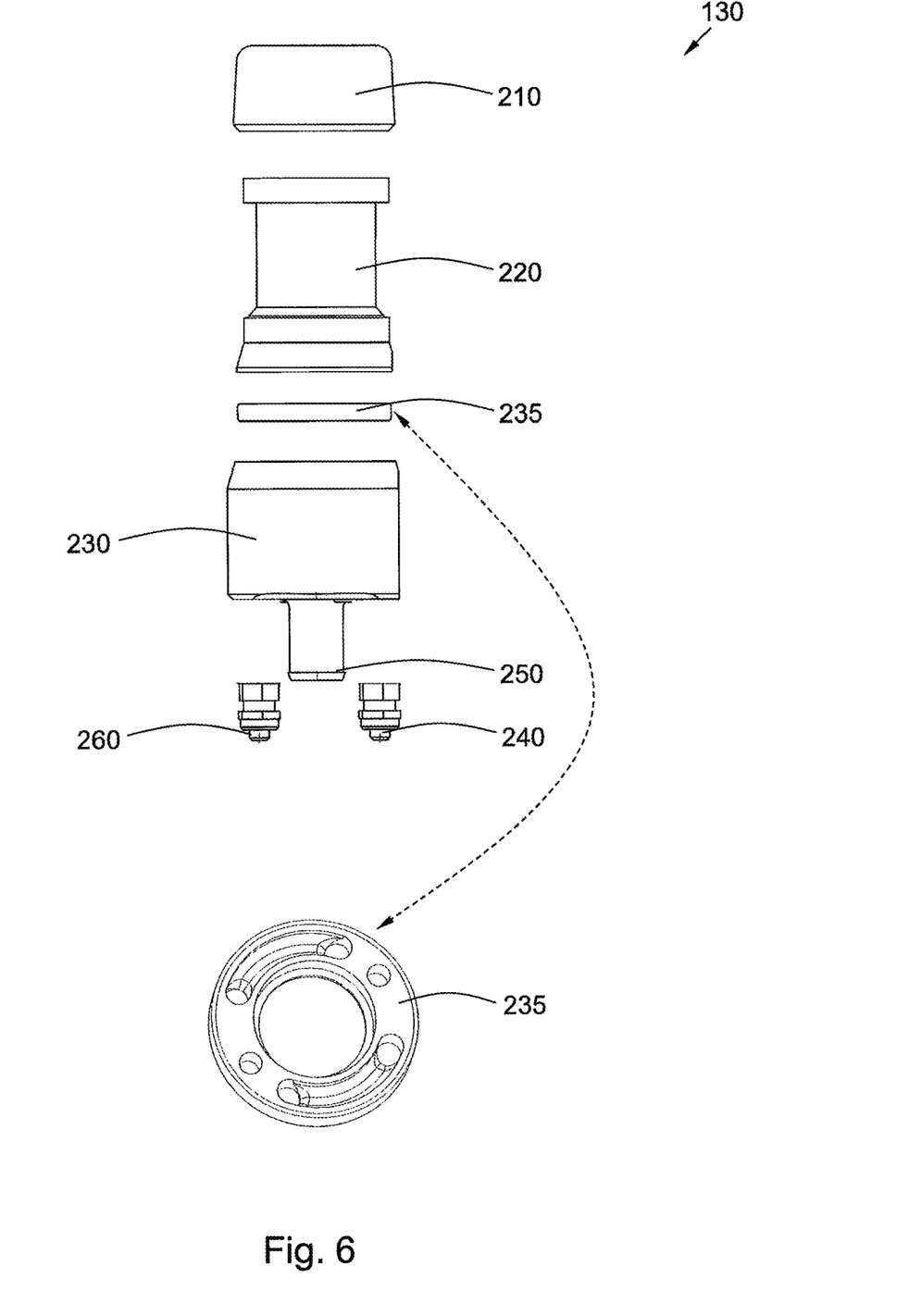
FIG. 6 illustrates an embodiment of the teat cleaning cup.

Between the lower part 230 and the teat cleaner is a seal 235 situated. The seal 235 may seal between the lower part 230 and the teat cleaner. The seal 235 is depicted in FIG. 6, and further discussed in the corresponding text.

FIG. 2C illustrates the cross section B-B of the teat cleaning cup 130 depicted in FIG. 2A.

The previously discussed set of channels 290 are illustrated, in this case comprising a first and a second group of channels.

The central cavity 280 of the teat cleaning cup 130 is intended to circumvent the teat 120 of the animal 100. The central cavity 180 communicates with the drainage means 250, or outlet, for draining used cleaning liquid from the teat cleaning cup 130. Further, vacuum (or perhaps rather: air of an air pressure lower than the current ambient air pressure) may be applied to the drainage means 250, for expanding the teat 120 and stretching the skin thereof. Thereby cracks dirt present on the teat 120 may be removed, as wrinkles in the teat skin are stretched out and a greater surface of the teat 120 is exposed to the injection cleaning. Also, the vacuum may stimulate pre-milking of the teat 120.

Further the teat cleaning cup 130 comprises at least one cavity 299, wherein a thread insert may be inserted. Thereby, a releasable fastening of the lower part 230 of the teat cleaning cup 130 with the teat cleaner may be enabled.

Figure 3A:
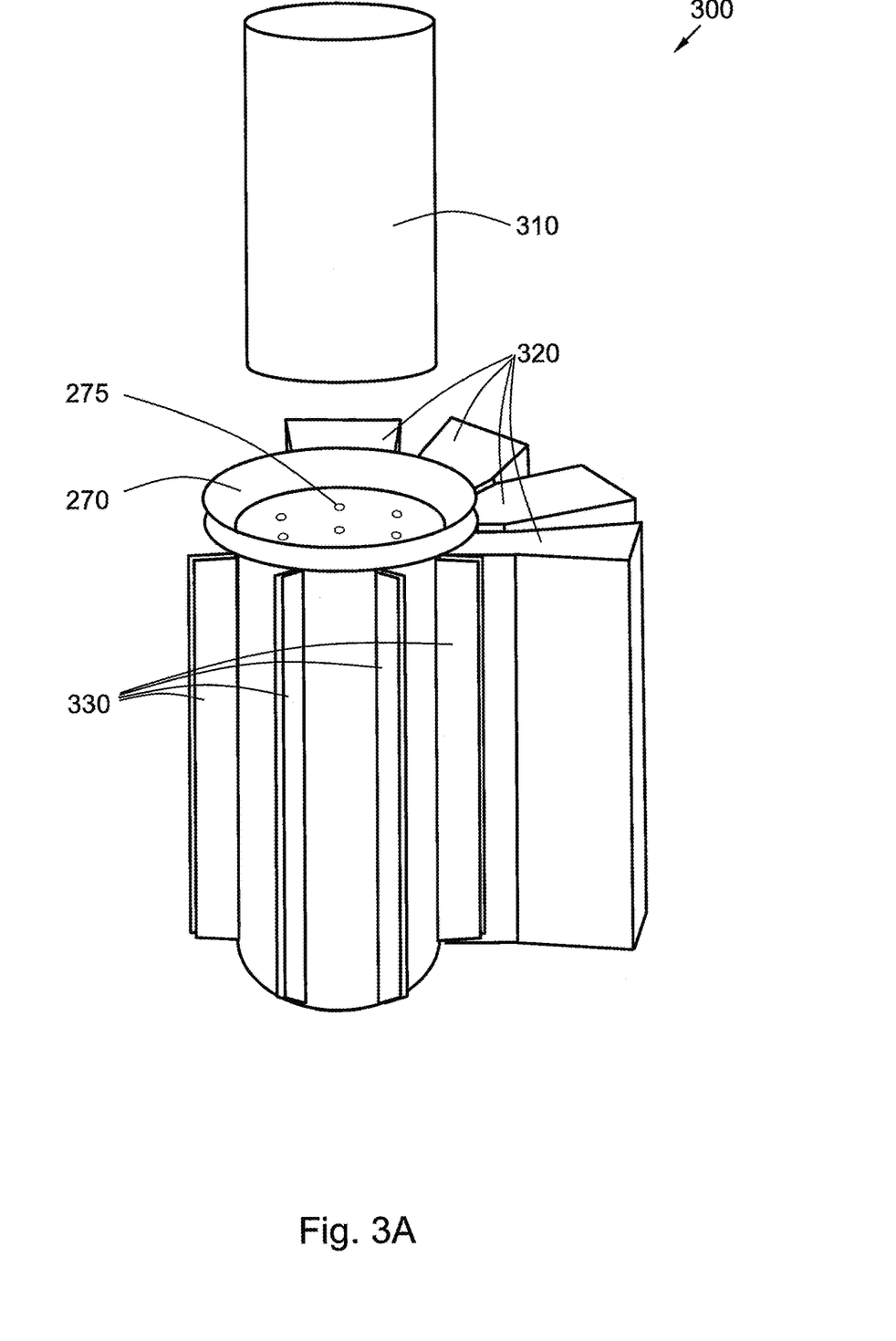
FIG. 3A illustrates an example of a first tool for moulding an inner body of a teat cleaner.

FIG. 3A illustrates a first tool 300 for moulding an inner body 270 of the teat cleaner.

The first tool 300 comprises a core 310 for forming the central cavity 280 of the inner body 270. Further, the first tool 300 also comprises a set of sliders 320 for forming channel walls 330 extending along the length of the inner body 270, thereby creating the set of channels 290.

Figure 3B:
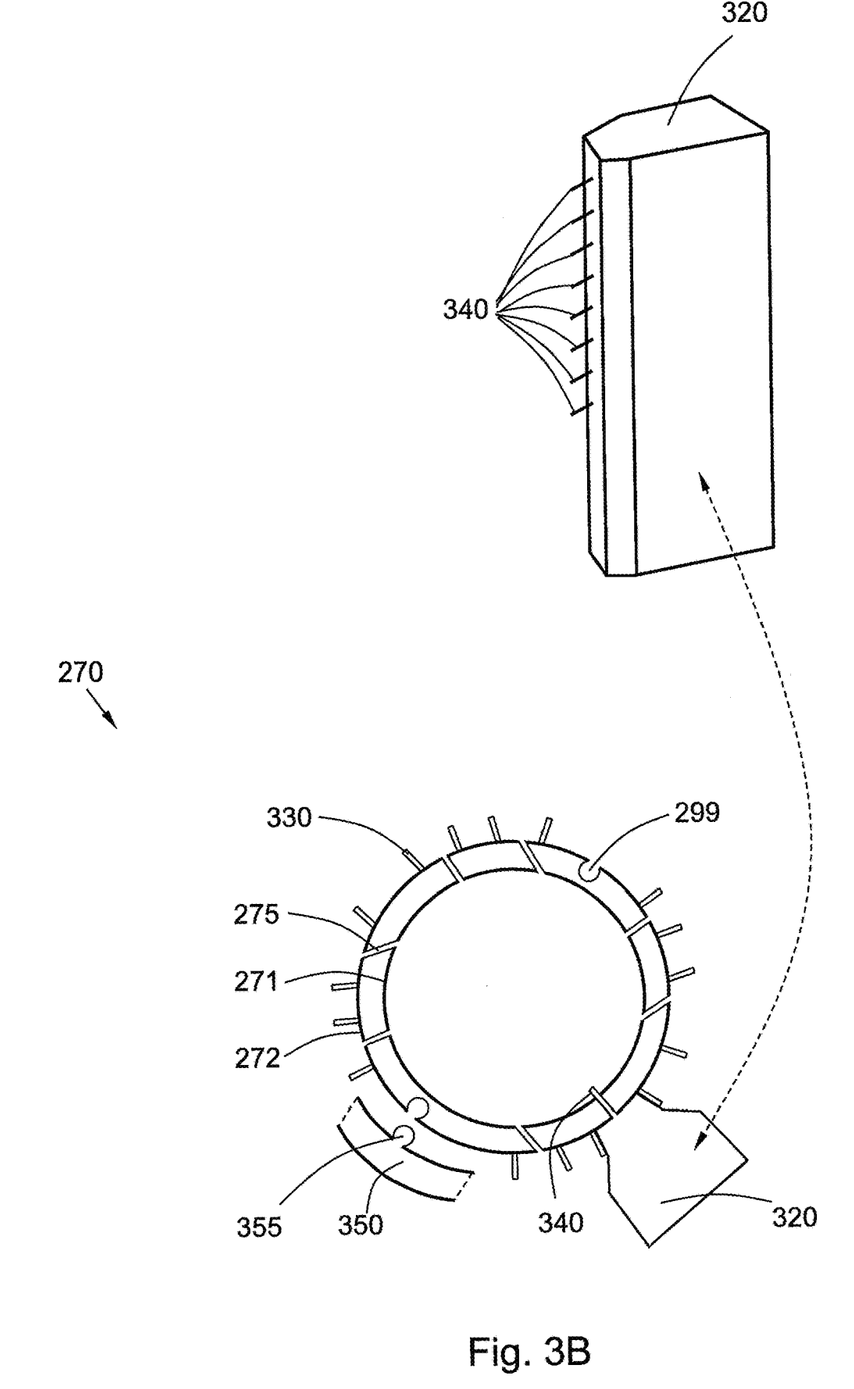
FIG. 3B illustrates an example of a slider comprising protrusions for forming apertures in the inner body of the teat cleaner.

The first tool 300 also comprises an outer casting mould, for forming the outer surface 272 of the inner body 270, as will be further illustrated in FIG. 3B.

FIG. 3B illustrates parts of the first tool 300, as previously presented in FIG. 3A.

The first tool 300 comprises an outer casting mould 350, for forming the outer surface 272 of the inner body 270. The outer casting mould 350 may comprise one or several protrusions 355, for forming a cavity 299, wherein a thread insert may be inserted in some embodiments.

Such optional thread insert may be used for removably attach the lower part 230 to the teat cleaner.

Further, the sliders 320 of the first tool 300 comprises at least one protrusion 340 for forming an aperture 275 in the inner body 270, extending from the outer surface 272 of the inner body 270 to the inner surface 271 of the inner body 270.

Figure 4:
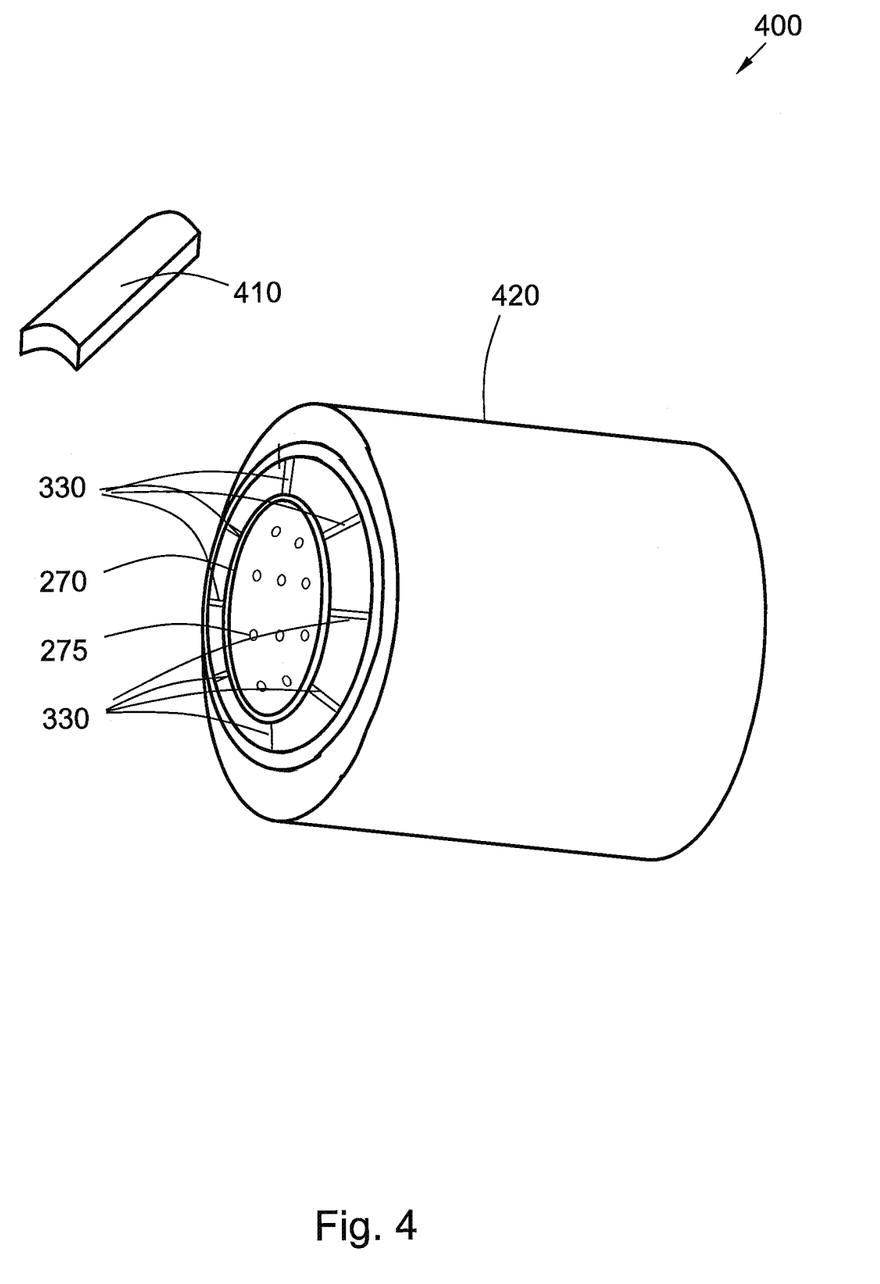
FIG. 4 illustrates an example of a second tool for moulding an exterior part of the teat cleaner.

FIG. 4 illustrates a second tool 400 comprising a casting mould 420 and a set of rods 410.

The rods 410 are inserted between the previously created channel walls 330 of the inner body 270, thereby forming the set of channels 290, between at least some of the channel walls 330 of the inner body 270.

The exterior part 220 of the teat cleaner is moulded in the second tool 400, thereby fusing the exterior part 220 with the inner body 270 for forming the teat cleaner.

Figure 5:
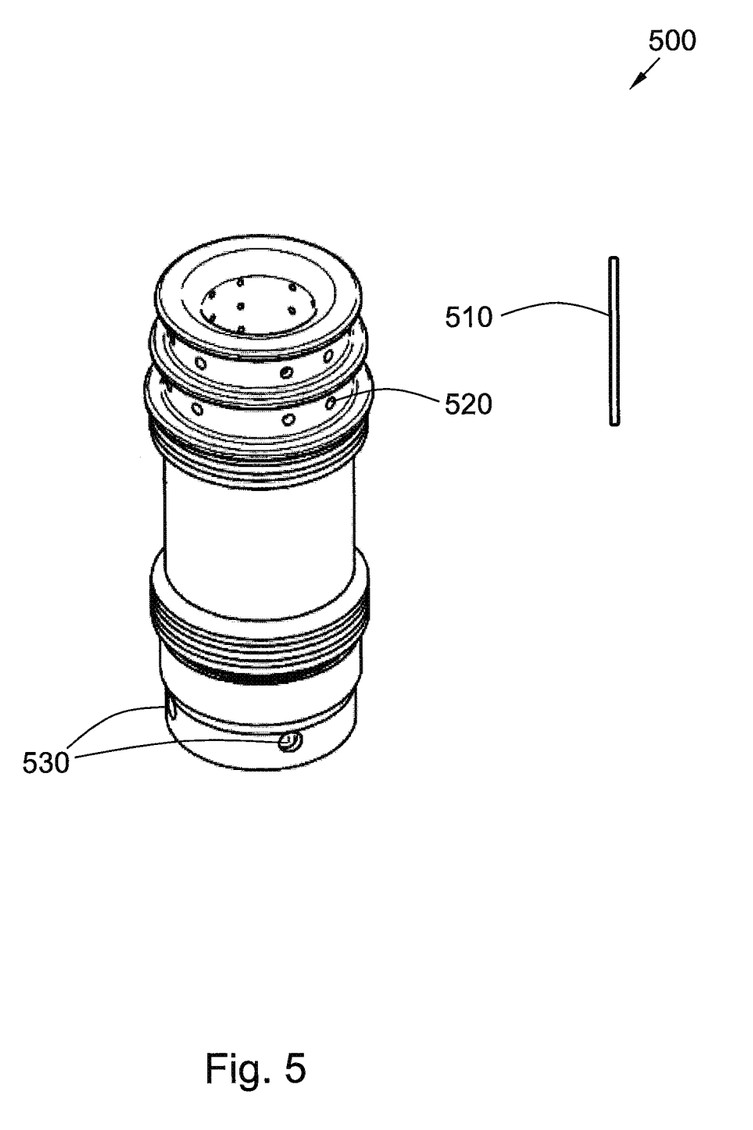
FIG. 5 illustrates an embodiment of the teat cleaner.

FIG. 5 illustrates a teat cleaner 500, after having been moulded. The teat cleaner 500 comprises a set of apertures 520 in the exterior part 220 of the teat cleaner 500, wherein a respective pin 510 has been inserted for fixating one rod 410 of the second tool during the second step of the moulding.

This arrangement is a solution to the problem of keeping the rods 410 of the second tool 400 in place during the moulding process. Melted thermoplastic material is injected under high pressure during the moulding process. In case the rods 410 are moved out of their respective positions, the formation of the set of channels 290 will be affected. It is thus an advantage to keep the rods 410 in place during the moulding, each with at least one pin 510, which is inserted in a respective, aperture 520 in the exterior part 220 of the teat cleaner 500, according to some embodiments.

Further, the teat cleaner 500 comprises at least one aperture 530 in the teat cleaner 500, which aperture 530 connects channels 290 comprised in the second subset of the channels with ambient air via the respective aperture 530 in the teat cleaner 500.

FIG. 6 illustrates a teat cleaning cup 130 in an embodiment, illustrating the different parts of the teat cleaning cup 130 and how they may interact with each other.

A teat cleaner cup collar 210 may be placed on the opening of the exterior part 220 of the teat cleaner 500, opposite to the drainage means 250. The teat cleaner cup collar 210 may be made in rubber, silicon or other similar elastic material. The teat cleaner cup collar 210 may seal against the teat 120 and/or the udder 110 of the animal 100. In addition, the teat cleaner cup collar 210 may cover the opening of the teat cleaner 500, for covering a set of apertures 520 in the exterior part 220 wherein a respective pin 510 has been inserted for fixating a rod 410. An advantage therewith is that dirt is obstructed from entering into the apertures 520.

Further, a seal 235 is placed between the teat cleaner 500 and a lower part 230, removably attached to the teat cleaner 500. The lower part 230, which may be machine manufactured in some embodiments, may comprise a first cleaning liquid valve 240 and a second cleaning liquid valve 260 and a drainage means 250 for draining used cleaning liquid from the teat cleaning cup 130.

The first cleaning liquid valve 240 and a second cleaning liquid valve 260 may be attached each to a group of the channels 290, which belongs to the second subset of the channels.

The drainage means 250 may be attached, to the central cavity 280.

The seal 235 comprises a first surface facing the teat cleaner 500 and a second surface facing the lower part 230. The seal 235 may be configured to distribute liquid from the cleaning liquid valve 240, 260 of the lower part 230 into the channels 290 in the teat cleaner 500, in some embodiments.

According to some embodiments, the seal 235 may form at least one first set of apertures, of at least a first aperture and a second aperture extending through the seal 235 from the first surface to the second surface. Further, the seal 235 may form at least one recess in the second surface, connecting the first aperture with the second aperture.

In some embodiments, the seal 235 forms the recess of the first set of apertures receives liquid from the first cleaning liquid valve 240 and distribute the liquid via the first aperture and the second aperture to the first channel subset in the teat cleaner 500; and the recess of the second set of apertures receives liquid from the second cleaning liquid valve 260 and distribute the liquid via the first aperture and the second aperture to the second channel subset in the teat cleaner 500 when the seal 235 is situated in a sealing position between the teat cleaner 500 and the lower part 230, during operation of the teat cleaning cup 130.

By distributing liquid via the recess in the seal 235, a complex solution of conduits for distribute the liquid is avoided.

In some possible embodiments, the seal 235 may comprise at least one protrusion, protruding from the first surface and fitting into the teat cleaner 500, e.g. into one of the air channels or a recess in the teat cleaner 500. Thereby, it becomes easier to mount the seal 235 correctly, also during bad visibility conditions, or when changed by an inexperienced person.

In some alternative embodiments, the seal 235 may form an aperture extending from the first surface to the second surface of the seal 235, configured for guiding used cleaning liquid from the teat cleaner 500 to the drainage means 250 of the lower part 230 when the seal 235 is situated in a sealing position between the teat cleaner 500 and the lower part 230, during operation of the teat cleaning cup 130.

As previously mentioned, the lower part 230 may be removably attached to the teat cleaner 500 by at least one fastening element, such as threaded fastener, e.g. a screw, a bolt, etc. However, also other alternative fasteners may be utilised such as e.g. a snap fastener, an R-clip pin, a split pin, a latch, a magnetic fastener, etc.

By having the lower part 230 removably attached to the teat cleaner 500, it becomes easy to open the teat cleaning cup 130 for cleaning and for changing the seal 235.

The seal 235 may in at least some such embodiments form one fastening element aperture extending through the seal 235 from the first surface to the second surface, for each fastening element.

The teat cleaning cup 130 may in some embodiments comprise a handle, for simplifying handling of the teat cleaning cup 130, both by a human and/or a robot.

Figure 7:
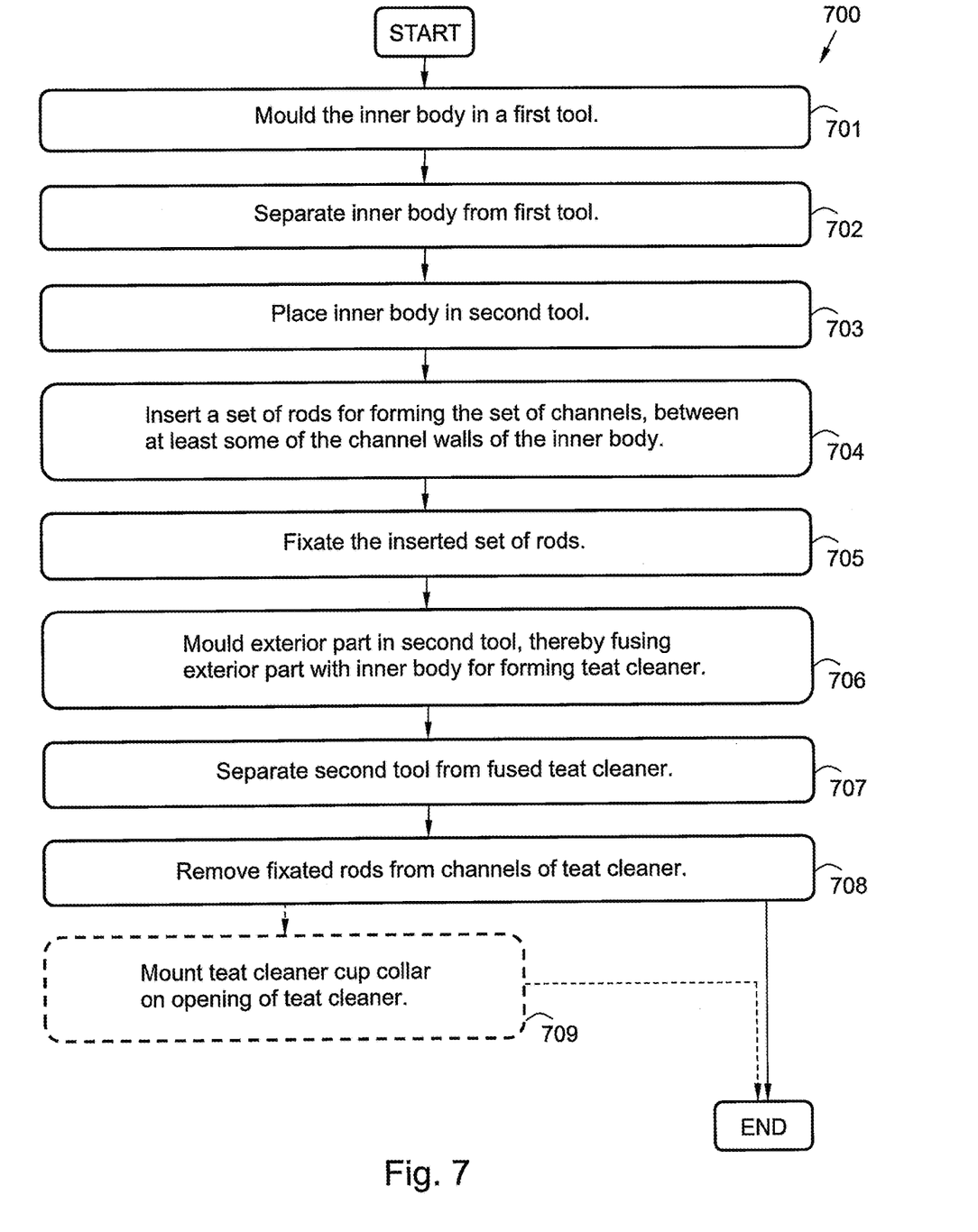
FIG. 7 is a flow chart illustrating an embodiment of a method.

FIG. 7 illustrates an example of a method 500 according to an embodiment. The flow chart in FIG. 7 shows the method 700 for producing a teat cleaner 500 of a teat cleaning cup 130. The teat cleaner 500 comprises an inner body 270, forming a central cavity 280 configured to enclose a teat 120 of an udder 110. The inner body 270 comprises an inner surface 271, facing the central cavity 280 and an outer surface 272. The inner body 270 also comprises an exterior part 220, enclosing the inner body 270. Further the inner body 270 also comprises a set of channels 290 situated between the inner body 270 and the exterior part 220, by injection moulding, such as two-step injection moulding.

In order to correctly perform the injection moulding of the teat cleaner 500, the method 700 may comprise a number of steps 701-709. However, some of these steps 701-709 may be performed solely in some alternative embodiments, like e.g. step 709. Further, the described steps 701-709 may be performed in a somewhat different chronological order than the numbering suggests. The method 700 may comprise the subsequent steps:

Step 701 comprises moulding the inner body 270, in a first tool 300.

Injection moulding is a manufacturing process for producing parts by injecting material into a mould. Injection moulding may be performed with a host of materials, such as e.g. elastomers, thermoplastic and/or thermosetting polymers; or similar material. During the moulding process, the material may be fed into a heated barrel, mixed, and forced into a mould cavity of the first tool 300.

Thermoplastics may be prevalent due to characteristics which make them highly suitable for injection moulding, such as the ease with which they may be recycled; their versatility allowing them to be used in a wide variety of applications; and their ability to soften and flow upon heating.

When the material, e.g. thermoplastics or other polymer is moulded, typically pelletised raw material is fed through a hopper into a heated barrel with a reciprocating screw. Upon entrance to the barrel the temperature increases and viscosity is thereby reduced, enabling the melted material to flow with the driving force of the injection unit. The screw delivers the raw material forward, mixes and homogenises the thermal and viscous distributions of the polymer, and reduces the required heating time by mechanically shearing the material and adding a significant amount of frictional heating to the polymer. The material feeds forward through a check valve and collects at the front of the screw into the first tool 300. This process may sometimes be referred to as the first shot.

In some embodiments, in order to prevent spikes in pressure during the moulding, a transfer position corresponding to a 95-98% full cavity of the first tool 300 may be defined, where the screw shifts from a constant velocity injection of the material into the first tool 300, to a constant pressure control. When the screw reaches the transfer position, the packing pressure may be applied, which completes mould filling and compensates for thermal shrinkage, which may be e.g. 10% (non-limiting example). The packing pressure may be applied until the gate, or cavity entrance solidifies.

The first tool 300 comprises a core 310 for forming the central cavity 280 of the inner body 270. Further, the first tool 300 also comprises a set of sliders 320, such as e.g. four sliders 320, or eight sliders 320 in some different embodiments, each comprising at least one protrusion 340 for forming an aperture 275 in the inner body 270, extending from the outer surface 272 of the inner body 270 to the inner surface 271 of the inner body 270. The sliders 320 also forms channel walls 330 extending along the length of the inner body 270. Also, the first tool 300 comprises an outer casting mould 350, for forming the outer surface 272 of the inner body 270.

The set of sliders 320 of the first tool 300 may be configured to form at least a first and a second group of apertures 275, separated circumferentially in the teat cleaner 500, connected to a respective channel 290 of the teat cleaner 500, in some embodiments.

The protrusions 340 of the set of sliders 320 of the first tool 300 may in some embodiments be angled tangentially with the central cavity 280 of the inner body 270. The angled protrusions 340 are thereby configured to form apertures 275 in the inner body 270, angled so as to inject the cleaning liquid tangentially onto an inserted teat 120.

The outer casting mould 350 of the first tool 300 may comprise at least one first protrusion 355, having a substantially circular cross-section, extending along at least a part of the outer casting mould 350. The first protrusion 355 may be configured to form a cavity 299 enabling insertion of a thread insert, thereby enabling a releasable fastening of a lower part 230 of the teat cleaning cup 130 with the teat cleaner 500, in some embodiments.

After a time period, the injected mould cools and hardens to the configuration of the cavity, i.e. the inner body 270. The required time period for the cooling may be reduced by applying external cooling, e.g. by using cooling lines circulating water or oil from a temperature controller, by applying a stream of cool air, etc.

Step 702 comprises separating the inner body 270 from the first tool 300. The separation may be made when the formed inner body 270 has cooled, by removing the various parts 310, 320, 350 of the first tool 300 from the inner body 270.

Step 703 comprises placing the inner body 270 in a second tool 400, comprising a casting mould 420 and a set of rods 410.

Step 704 comprises inserting the set of rods 410 for forming the set of channels 290, between at least some of the channel walls 330 of the inner body 270.

Step 705 comprises fixating the inserted 704 set of rods 410 to the inner body 270.

The inserted 704 rods 410 may be fixated by a respective pin/s 510 in some embodiments, fixating the rod 410 in position against the inner body 270, in some embodiments.

Step 706 comprises moulding the exterior part 220 in the second tool 400, thereby fusing the exterior part 220 with the inner body 270 for forming the teat cleaner 500. This may also be referred to as the second shot.

The exterior part 220 of the teat cleaner 500 may in some embodiments be moulded with a set of exterior flanges 225, at least partly circumventing the exterior part 220, for fixating the teat cleaner cup collar 210 to the opening of the teat cleaner 500 by fitting into a set of recesses 212 of the teat cleaner cup collar 210.

Step 707 comprises separating the second tool 400 from the fused teat cleaner 500, when the mould has cooled.

Step 708 comprises removing the fixated 705 set of rods 410 from the set of channels 290 of the teat cleaner 500.

Step 709, which only may be performed in some embodiments, comprises mounting a teat cleaner cup collar 210 on the opening of the teat cleaner 500, for covering a set of apertures 520 in the exterior part 220 wherein a respective pin 510 has been inserted for fixating 705 one rod 410.

The terminology used in the description of the embodiments as illustrated in the accompanying drawings is not intended to be limiting of the described method 700; teat cleaner 500; and/or teat cleaning cup 130. Various changes, substitutions and/or alterations may be made, without departing from invention embodiments as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures or features are recited in mutually different dependent claims, illustrated in different figures or discussed in conjunction with different embodiments does not indicate that a combination of these measures or features cannot be used to advantage.

The invention claimed is:

1. A method (700) for producing a teat cleaner (500) of a teat cleaning cup (130), which teat cleaner (500) comprises an inner body (270) forming a central cavity (280) configured to enclose a teat (120) of an udder (110), wherein the inner body (270) comprises an inner surface (271) facing the central cavity (280) and an outer surface (272), and an exterior part (220) enclosing the inner body (270), and a set of channels (290) situated between the inner body (270) and the exterior part (220), the method (700) comprising steps of:
   injection moulding (701) the inner body (270) in a first tool (300), the first tool comprising:
   a core (310) for forming the central cavity (280) of the inner body (270);
   a set of sliders (320) for forming channel walls (330) extending along the length of the inner body (270), each slider (320) comprising at least one protrusion (340) for forming at least one aperture (275) in the inner body (270), extending from the outer surface (272) of the inner body (270) to the inner surface (271) of the inner body (270); and
   an outer casting mould (350), for forming the outer surface (272) of the inner body (270);
   after injection moulding (701) the inner body (270) in the first tool (300), separating (702) the inner body (270) from the first tool (300);
   placing (703) the inner body (270) in a second tool (400) comprising a casting mould (420) and a set of rods (410) for forming the set of channels (290);
   inserting (704) the set of rods (410), between at least some of the channel walls (330) of the inner body (270);
   fixating (705) the inserted (704) set of rods (410);
   injection moulding (706) the exterior part (220) in the second tool (400), thereby fusing the exterior part (220) with the inner body (270) for forming a fused teat cleaner (500);
   separating (707) the second tool (400) from the fused teat cleaner (500); and
   removing (708) the fixated (705) set of rods (410) from the set of channels (290) of the teat cleaner (500).

2. The method (700) according to claim 1, wherein the inserted (704) set of rods (410) is fixated (705) by at least one pin (510) for each rod (410).

3. The method (700) according to claim 2, further comprising:
   mounting (709) a teat cleaner cup collar (210) on an opening of the teat cleaner (500), for covering a set of apertures (520) in the exterior part (220) wherein a respective pin (510) has been inserted for fixating (705) one rod (410).

4. The method (700) according to claim 3, wherein the exterior part (220) of the teat cleaner (500) is moulded (706) with a set of exterior flanges (225), at least partly circumventing the exterior part (220), for fixating the teat cleaner cup collar (210) to the opening of the teat cleaner (500) by fitting into a set of recesses (212) of the teat cleaner cup collar (210).

5. The method (700) according to claim 1, wherein the set of sliders (320), of the first tool (300) is configured to form at least a first and a second group of apertures (275), separated circumferentially in the teat cleaner (500), connected to a respective channel (290) of the teat cleaner (500).

6. The method (700) according to claim 1, wherein at least some of the protrusions (340) of the set of sliders (320) of the first tool (300) are angled tangentially with the central cavity (280) of the inner body (270), thereby configured to form apertures (275) in the inner body (270), angled so as to inject the cleaning liquid tangentially onto an inserted teat (120).

7. The method (700) according to claim 1, wherein the outer casting mould (350) of the first tool (300) comprises at least one first protrusion (355), having a substantially circular cross-section, extending along at least a part of the outer casting mould (350) wherein the first protrusion (355) is configured to form a cavity (299) enabling insertion of a thread insert, thereby enabling a releasable fastening of a lower part (230) of the teat cleaning cup (130) with the teat cleaner (500).

8. The method (700) according to claim 2, wherein the set of sliders (320), of the first tool (300) is configured to form at least a first and a second group of apertures (275), separated circumferentially in the teat cleaner (500), connected to a respective channel (290) of the teat cleaner (500).

9. The method (700) according to claim 2, wherein at least some of the protrusions (340) of the set of sliders (320) of the first tool (300) are angled tangentially with the central cavity (280) of the inner body (270), thereby configured to form apertures (275) in the inner body (270), angled so as to inject the cleaning liquid tangentially onto an inserted teat (120).

10. The method (700) according to claim 2, wherein the outer casting mould (350) of the first tool (300) comprises at least one first protrusion (355), having a substantially circular cross-section, extending along at least a part of the outer casting mould (350) wherein the first protrusion (355) is configured to form a cavity (299) enabling insertion of a thread insert, thereby enabling a releasable fastening of a lower part (230) of the teat cleaning cup (130) with the teat cleaner (500).

11. The method (700) according to claim 3, wherein the set of sliders (320), of the first tool (300) is configured to form at least a first and a second group of apertures (275), separated circumferentially in the teat cleaner (500), connected to a respective channel (290) of the teat cleaner (500).

12. The method (700) according to claim 3, wherein at least some of the protrusions (340) of the set of sliders (320) of the first tool (300) are angled tangentially with the central cavity (280) of the inner body (270), thereby configured to form apertures (275) in the inner body (270), angled so as to inject the cleaning liquid tangentially onto an inserted teat (120).

13. The method (700) according to claim 3, wherein the outer casting mould (350) of the first tool (300) comprises at least one first protrusion (355), having a substantially circular cross-section, extending along at least a part of the outer casting mould (350) wherein the first protrusion (355) is configured to form a cavity (299) enabling insertion of a thread insert, thereby enabling a releasable fastening of a lower part (230) of the teat cleaning cup (130) with the teat cleaner (500).

14. The method (700) according to claim 4, wherein the set of sliders (320), of the first tool (300) is configured to form at least a first and a second group of apertures (275), separated circumferentially in the teat cleaner (500), connected to a respective channel (290) of the teat cleaner (500).

15. The method (700) according to claim 4, wherein at least some of the protrusions (340) of the set of sliders (320) of the first tool (300) are angled tangentially with the central cavity (280) of the inner body (270), thereby configured to form apertures (275) in the inner body (270), angled so as to inject the cleaning liquid tangentially onto an inserted teat (120).

16. The method (700) according to claim 4, wherein the outer casting mould (350) of the first tool (300) comprises at least one first protrusion (355), having a substantially circular cross-section, extending along at least a part of the outer casting mould (350) wherein the first protrusion (355) is configured to form a cavity (299) enabling insertion of a thread insert, thereby enabling a releasable fastening of a lower part (230) of the teat cleaning cup (130) with the teat cleaner (500).

17. The method (700) according to claim 5, wherein at least some of the protrusions (340) of the set of sliders (320) of the first tool (300) are angled tangentially with the central cavity (280) of the inner body (270), thereby configured to form apertures (275) in the inner body (270), angled so as to inject the cleaning liquid tangentially onto an inserted teat (120).

18. The method (700) according to claim 5, wherein the outer casting mould (350) of the first tool (300) comprises at least one first protrusion (355), having a substantially circular cross-section, extending along at least a part of the outer casting mould (350) wherein the first protrusion (355) is configured to form a cavity (299) enabling insertion of a thread insert, thereby enabling a releasable fastening of a lower part (230) of the teat cleaning cup (130) with the teat cleaner (500).

19. The method (700) according to claim 6, wherein the outer casting mould (350) of the first tool (300) comprises at least one first protrusion (355), having a substantially circular cross-section, extending along at least a part of the outer casting mould (350) wherein the first protrusion (355) is configured to form a cavity (299) enabling insertion of a thread insert, thereby enabling a releasable fastening of a lower part (230) of the teat cleaning cup (130) with the teat cleaner (500).

\* \* \* \* \*